United States Patent [19]

Chen

[11] Patent Number: 5,284,316
[45] Date of Patent: Feb. 8, 1994

[54] HYDRAULIC MAGNETIC CONTROL VALVE

[76] Inventor: Cheng-Hao Chen, No. 21 Lane 117, Sec 2 Si Chuan Rd., Pan Chiao, Taipei Hsien, Taiwan

[21] Appl. No.: 58,122

[22] Filed: May 10, 1993

[51] Int. Cl.⁵ .................................................. F16K 31/08
[52] U.S. Cl. ................................... 251/65; 251/129.11
[58] Field of Search ............................. 251/65, 129.11

[56] References Cited

U.S. PATENT DOCUMENTS 3,609,425  9/1971  Sheridan .......................... 251/65 X
5,052,429  10/1991  Yoo ................................. 251/65 X Primary Examiner—Arnold Rosenthal
Attorney, Agent, or Firm—Bacon & Thomas

[57] ABSTRACT

A hydraulic magnetic control valve includes a base with an inlet and an outlet. A plug provided with a second magnetic member formed thereon is arranged above the outlet of the base for controlling the hydraulic flow, and the top surface of the base is mounted a driving motor. One of the side walls of the base is in a form of a slanted side wall, on which a first magnetic member is slidable upward or downward along the slanted side wall under control of the driving motor. When the first magnetic member slides downward along the slanted side wall, the control valve is in open situation permitting hydraulic material flow from the inlet to the outlet, while the first magnetic member slides upward along the slanted side wall, the control valve is in closed situation thereby stopping up the flow.

1 Claim, 2 Drawing Sheets

HYDRAULIC MAGNETIC CONTROL VALVE

BACKGROUND OF THE INVENTION

The present invention relates to an improved hydraulic magnetic control valve, and more particularly to a electromagnetic type control valve having a slanted side wall for controlling hydraulic material with advantages of low power consumption and good reliability during operation.

Hydraulic magnetic control valves are widely used in applications of hydraulic control system for controlling the flow of the hydraulic material, such as water. Typically, the conventional hydraulic magnetic control valve is provided with an electromagnetic coil and a plug received in the inner space of the control valve. The plug, positioned on the outlet of the valve, is adapted to close the outlet of the control valve, so as to stop up the water flow from the inlet to the outlet of the control valve. In addition, a magnetic member is attached to the top surface of the plug, which is magnetically associated with the electromagnetic coil during actuation of the coil. In such an arrangement, the control valve may be operated under control of magnetic force generated by the electromagnetic coil thereby controlling the water flow.

However, it is found that the prior art hydraulic magnetic control valve has disadvantage of poor reliability during stand-by condition of the electromagnetic coil of the control valve. One of the important reasons is that the position of the electromagnetic coil is unchangeable and is normally arranged near in space to the magnetic member. For example, in case that the intrinsic magnetic force of the electromagnetic coil is strong, the magnetic member is occasionally influenced by the electromagnetic coil, no matter whether the electromagnetic coil is energized or not.

SUMMARY OF THE INVENTION

In order to obviate the aforementioned problem of the prior art, the primary object of the present invention is to provide an improved hydraulic magnetic control valve. The present invention is provided with a slanted side wall and a movable magnetic member slidable along the slanted side wall of the control valve, so as to correctly control the operation of the plug of the control valve.

The other object of the present invention is to provide a hydraulic magnetic control valve with advantage of low power consumption during operation. In the preferred embodiment of the present invention, the slidable magnetic member is dragged by a driving motor positioned on the base of the control valve. During both forward or reverse operation of the driving motor, it consumes less power energy to operate the control valve. Furthermore, once the control valve is in open situation, the driving motor is no longer to be energized. Therefore, it is possible to save unnecessary electrical power during the open situation of the control valve until returning to closed situation.

To achieve the objects described above, the structure of the preferred embodiment in accordance with the present invention includes a base with an inlet and an outlet. A plug generally made of rubber material is arranged just above the outlet of the base for controlling the hydraulic flow. A driving motor serving as a driving device is mounted on the top surface of the base. One of the side walls of the base is in a form of a slanted side wall, on which a first magnetic member is slidable upward or downward along the slanted side wall under drag operation of the driving motor. When the first magnetic member slides downward along the slanted side wall under control of the motor, the plug together with the second magnetic member will move away from the outlet of the base, by way of the influence of the first magnetic member, permitting hydraulic material flow from the inlet to the outlet of the base. On the contrary, when the first magnetic member slides upward along the slanted side wall, the plug will cover over the outlet of the base so as to stop up the hydraulic flow.

The present invention will become more apparent from the following description taken in connection with the accompanying drawings, wherein:

DESCRIPTION OF THE PREFERRED EMBODIMENT

Figure 1:
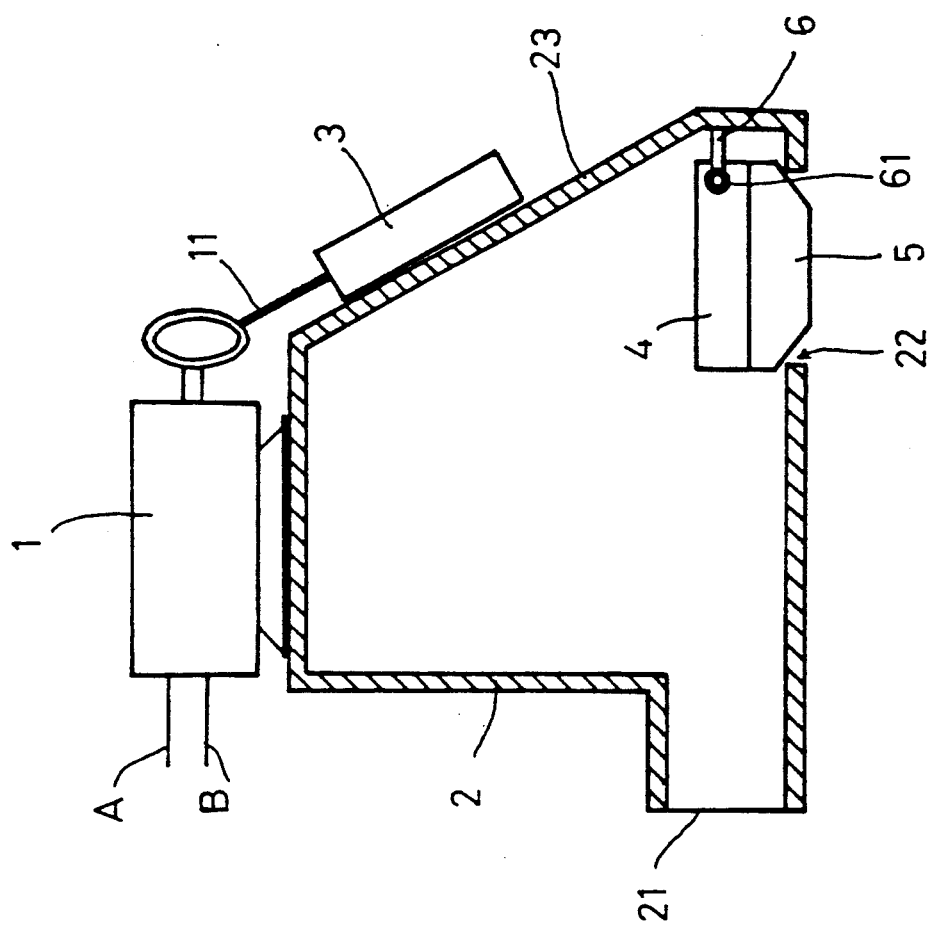
FIG. 1 is a side elevation in cross-section of the hydraulic control valve of the present invention, illustrating the control valve is in closed situation.

Referring now to FIG. 1, a hydraulic magnetic control valve is illustrated in accordance with the present invention, illustrating the control valve is in closed situation. The control valve is adapted to control the flow of hydraulic material, such as water. The control valve as shown comprises a base 2 with an inlet 21 and an outlet 22, providing flowing path for the hydraulic material. In the inner space of the control valve, there is provided with a plug 5 for permitting or stopping the water flow from the inlet to the outlet. Commonly, the plug 5 is made of rubber material. In the closed situation as shown in the figure, the plug 5 tightly covers over the opening of the outlet 22, so as to stop up the water flow.

Figure 2:
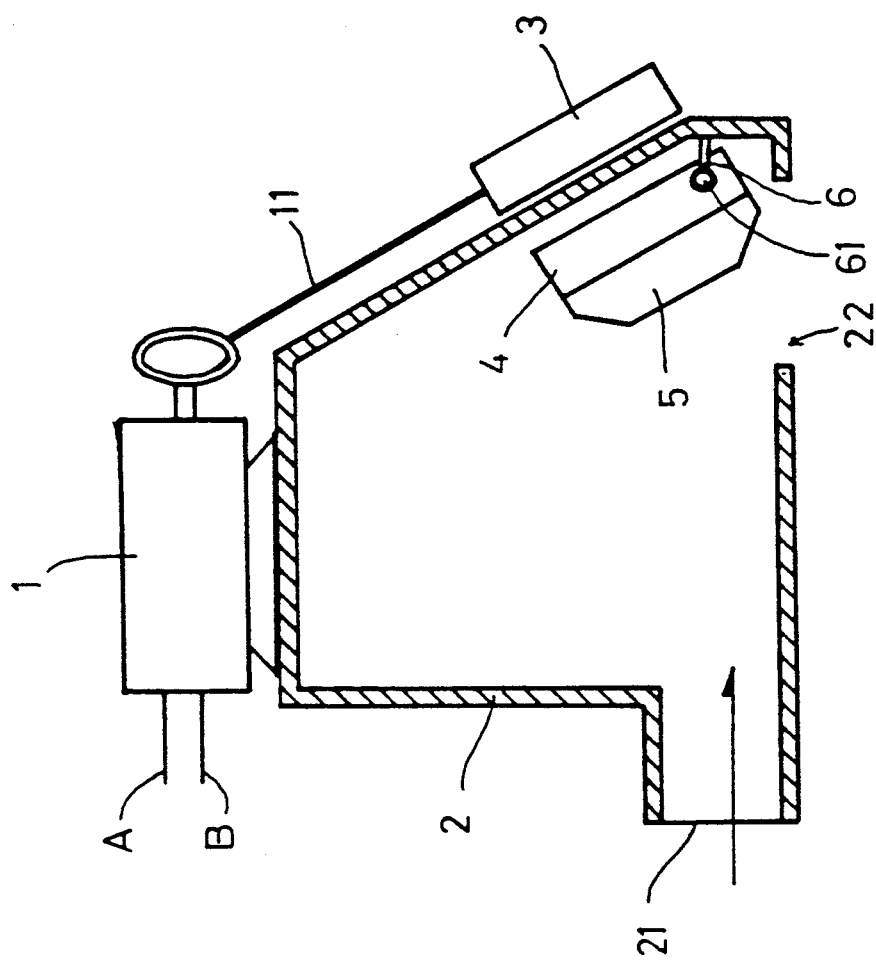
FIG. 2 is a side elevation in cross-section of the hydraulic control valve of the present invention, illustrating the control valve is in open situation.

In case that the plug 5 is in open situation, as shown in FIG. 2, the water flow (as shown by solid line arrow in the drawing) may enter from the inlet 21 into the inner space of the base 2, and then flow to the outlet 22. That is, it is possible to control the water flow by means of controlling the position of the plug 5.

In order to control the operation of the plug, the present invention is provided with a first magnetic member 3 and a second magnetic member 4.

The second magnetic member 4 is rigidly attached to the top surface of the plug 5, forming a unitary element in structure and in operation. In this preferred embodiment, the magnetic pole of the second magnetic member 4 is negative pole. The right end portion of the magnetic member 4 has a pivot axis 61. The inner wall of the base 2 extends a horizontal supporting rod 6 corresponding in position to the pivot axis 61 of the second magnetic member 4, so that the magnetic member 4 may be supported by the rod 6 in position above the outlet 22 and pivotally rotate around the pivot axis 61 acting as a rotating center. In such arrangement, the plug 5 may open or cover over the outlet 22.

One of the side walls of the base 2 is in a form of slanted side wall 23. The first magnetic member 3 is positioned on the slanted side wall 23. The outlet 22 of the control valve is formed beneath the slanted side wall 23, so that the plug 5 is correspondingly arranged adjacent to the interior side of the slanted side wall 23.

A driving device 1 is mounted on the top surface of the base 2 of the control valve, serving as an actuator used to move the first magnetic member 3 along the slanted side wall 23 upward or downward. In the preferred embodiment of the present invention, the driving device is a miniature D.C. driving motor. It is to be understood that the driving device may be replaced with the other driving device, such as a solenoid. The first magnetic member 3 may be slidable upward or downward along the slanted side wall 23 by the driving motor 1 via a drag rope 11. One end of the drag rope 11 is connected to the first magnetic member 3, and the other end of the drag rope is wound onto the rotation rod of the driving motor 1. In case that the driving motor 1 is replaced with a solenoid actuator, the drag rope 11 may be a drag rod.

The first magnetic member 3 is of the type of positive pole for the purpose of reversal matching with the negative magnetic pole of the second magnetic member 4.

In open operation of the control valve, referring to FIG. 2, the power line A of the driving motor 1 is connected to a positive voltage while the other power line B of the driving motor 1 is connected to a negative voltage. In such a power connection, the driving motor 1 rotates in forward direction, causing the drag rope 11 to be extent by the gravity of the first magnetic member 3, and at the same time the first magnetic member 3 slides downward along the slanted side wall 23. When the first magnetic member 3 slides downward closed to the lower section of the slanted side wall 23, the magnetic force generated by the first magnetic member 3 will influence the second magnetic member 4. Finally, the plug 5 together with the second magnetic member 4 will be moved away from the outlet 22 and attached to the interior side of the slanted side wall 23 by the magnetic force of the first magnetic member 3. At this situation, the water flow may freely flow to the outlet from the inlet of the control valve.

In closed operation of the control valve, the power line A of the driving motor 1 is connected to a negative voltage while the other power line B of the driving motor 1 is connected to a positive voltage, so that the driving motor 1 rotates in reversed direction, causing the drag rope 11 to be rewound onto the rotation shaft of the driving motor 1. At the same time, the first magnetic member 3 slides upward along the slanted side wall 23. When the first magnetic member 3 slides upward from the lower section to the upper section, the magnetic force generated by the first magnetic member 3 will loss its influence with respect to the second magnetic member 4. Therefore, the plug 5 drops and covers over the outlet again to stop up the water flow.

The slanted side wall 23 of the preferred embodiment of the present invention described above is in the form of a smooth sloped plate. Obviously, it is possible to mount two vertical guide plates both on the two edge sides of the slanted side wall 23. The function of the guide plates is to guide the first magnetic member 3 to prevent swing movement of the first magnetic member 3 during sliding operation.

From the detailed description above, it is to be understood that the present invention has advantage of low power consumption. The reasons are as follows:

1. The driving motor needs only few power connection time, normally 0.5 second, during both forward or reversed operation.

2. In open operation of the control valve, the plug first moves away from the outlet of the control valve, then the water flow continuously flows from inlet to outlet of the base of the control valve. At this time, the first magnetic member and the second magnetic member are magnetically associated by the magnetic force therebetween, remaining the control valve in open situation. That is, once the second magnetic members is in open situation, the driving motor is not necessary to be energized any more. In performance of the closed operation of the control valve, simply reversal rotating the driving motor to drag up the first magnetic member, the plug will immediately cover over the outlet of the control valve to stop up the water flow.

The present invention is apparent from the above detailed description. Many changes and modifications in the above described embodiment of the invention can be carried out without departing from the scope thereof. Accordingly, the present invention is disclosed and is intended to be limited only by the scope of the appended claims.

I claim:

1. A hydraulic magnetic control valve for controlling hydraulic flow, comprising:

a base having an inlet and an outlet, one wall of the base being a slanted side wall and the outlet thereof being formed beneath the slanted side wall;

a plug positioned above the outlet of the base, used to open or close the outlet;

a first magnetic member;

a D.C. driving motor mounted on the base, for moving the first magnetic member upward or downward along the slanted side wall; and a second magnetic member attached to the plug;

whereby the first magnetic member slides downward along the slanted side wall, the second magnetic member together with the plug moves away from the outlet of the base to permit the hydraulic flow from the inlet to the outlet of the base; while the first magnetic member slides upward along the slanted side wall, the plug covers over the outlet of the base to stop up the hydraulic flow.

* * * * *